United States Patent [19]
Rabe et al.

[11] Patent Number: 4,991,545
[45] Date of Patent: Feb. 12, 1991

[54] STEAM GENERATOR FOR COOKING EQUIPMENT HAVING A DECALCIFICATION MEANS

[76] Inventors: Hermann Rabe, Ahornallee 18, D8910 Landsberg/Lech; Jaroslav Klouda, Livry-Gargan-Str. 13/7, D8080 Fuerstenfeldbruck; Ladislav Lafuntal, Schlossstr. 69, D8031 Esting; Siegfried Meister, Siemensstr 2, 8910 Landsberg/Lech, all of Fed. Rep. of Germany

[21] Appl. No.: 481,602

[22] Filed: Feb. 16, 1990

[30] Foreign Application Priority Data

Feb. 17, 1989 [DE] Fed. Rep. of Germany ....... 8901904

[51] Int. Cl.$^5$ .......................... F22B 37/54; F28G 9/00
[52] U.S. Cl. .................................... 122/382; 122/379; 122/381
[58] Field of Search ............... 122/381, 382, 383, 504, 122/379

[56] References Cited

U.S. PATENT DOCUMENTS

| | | | |
|---|---|---|---|
| 1,557,752 | 10/1925 | Yowell | 122/383 |
| 1,616,372 | 2/1927 | Janson | |
| 1,679,051 | 7/1928 | Nicholson | 122/383 |
| 4,848,278 | 7/1989 | Theiss | 122/383 |

Primary Examiner—Edward G. Favors
Attorney, Agent, or Firm—Hill, Van Santen, Steadman & Simpson

[57] ABSTRACT

A steam generator for supplying steam to cooking equipment comprises a water-filled boiler comprising an automatic, level-regulated water emission, a steam discharge for automatic introduction of hot steam into a cooking chamber for the cooking equipment as needed, a heating unit operating at intervals and a decalcification arrangement having a water drain arranged close to the floor and to a side wall of the boiler for, as needed, at least partial emptying of the boiler for the purpose of flushing-out lime particles that flake off and collect on the floor of the boiler. Preferably, the decalcification arrangement comprises an arrangement for generating a flow in the steam generator that automatically kicks in at preferably adjustable intervals dependent on the operating duration and/or temperature of the heating unit to supply water to an elimination device. The arrangement for generating a flow can encompass the eliminating device and can be either a suction tube having a drain provided at the floor of the boiler; a flushing pump having a flushing admission lying diametrically opposite close to the boiler wall; or a steam pump that comprises a cooling device for the precipitation of the line particles.

12 Claims, 5 Drawing Sheets 4,991,545

STEAM GENERATOR FOR COOKING EQUIPMENT HAVING A DECALCIFICATION MEANS

BACKGROUND OF THE INVENTION

The invention is directed to a steam generator for creating steam for use in cooking equipment, particularly for table-top or footed equipment working in combined operation using hot air and hot steam for gastronomy, industrial kitchens and the like. The generator comprises a water-filled boiler that in turn comprises an automatically level-regulated water admission, a steam discharge for the automatic introduction of hot steam into the cooking space of the cooking equipment as needed and a heating mechanism operating in intervals, for example, in the form of heat exchanger surfaces which are heated electrically or with gas heating, and a decalcification means having a water outlet means arranged close to the floor and to the side wall of the boiler for at least partially emptying the boiler as needed for the purpose of flushing off lime particles that have flaked off and have been collected at the floor of the boiler.

There is the problem in such steam generators, which are normally exposed to high thermal stresses as a consequence of intense employment of the appertaining cooking equipment, and this problem is that thick lime deposits form over time both at the heat exchanger surfaces of the heating means—i.e., at the corresponding heating rods or heating coils of electrically operated equipment and at the corresponding heat exchanger tubes in the case of gas-operated equipment. Lime deposits also occur at the boiler walls. These lime deposits must be removed from time to time since they impede the heat transmission at the heat exchanger surfaces; however, they must also be removed from the inside surfaces of the boiler since they can have negative influences on the quality of the generated steam because certain substances that, for example, can influence the properties of the generated steam in a negative way in view of the taste of the products to be cooked can become concentrated in these lime deposits.

It is known to remove the lime deposits in that the user of the cooking equipment dissolves the lime deposits at more or less regular intervals by introducing a chemically acting decalcification means into the boiler and heating outside of normal operation. These lime deposits, for example, are then discharged through a drain cock specifically provided for this purpose while emptying the boiler.

A certain decalcification effect can also be achieved without introducing a chemically acting decalcification agent.

U.S. Pat. No. 1,616,372 discloses a cleaning mechanism for heating equipment that is composed of a flat chamber that is arranged at the floor of the heating equipment and is provided with a plurality of openings that are arranged such that, when a valve that is in communication with the cleaning chamber is open, the out-flowing agent can eliminate the deposits in the heating device through the cleaning chamber. What is thereby exploited is that a certain over-pressure prevails in the heating equipment. The decalcification effect, however, is not satisfactory. This is due, first, to the fact that it is necessary for the user to in fact effect the decalcification at certain intervals by actuating the drain cock, a measure that is frequently omitted as a consequence of carelessness. Further, the pressure arising in the equipment of the initially stated species is quite inadequate for reliably eliminating the sediment particles. Moreover, only lime particles that are easily detached from the heat exchangers, or, respectively, from the inside surfaces of the boiler proceed into the cleaning container. Firmly adhering lime particles continue to lead to the impediments that were set forth above.

It is also known to employ a drain cock as water outlet means in order to eliminate the lime particles from time to time that collect at the floor of the boiler in the form of small particles. However, the flow that arises when emptying the boiler is definitely not adequate to convey the lime particles deposited at the floor of the boiler out through the drain cock. On the contrary, the drain cock is usually already plugged briefly after the start of a decalcification process, i.e., after the drain cock is opened, so that the lime deposits cannot be reliably eliminated. Further, the lime particles entering into the interior of the drain cock and into its closing mechanism plug these up to an increasing degree due to the lack of an adequate rate of flow of the out-flowing water, so that an effective decalcification is no longer guaranteed after a relatively short operating time.

SUMMARY OF THE INVENTION

It is therefore an object of the invention to create a steam generator of the stated species that automatically guarantees an improved elimination of the disturbing lime without intervention of the user.

To accomplish these objects, the present invention is directed to an improvement in a steam generator for cooking equipment, particularly for table-top or footed equipment for gastronomy, industrial kitchens or the like working in combination with hot air and hot steam, the generator comprising a water-filled boiler having an automatic, level-regulated water admission, a steam discharge for automatic introduction of hot steam into the cooking chamber of the cooking equipment as needed, said generator having heating means operating at intervals, for example in the form of heat exchanger surfaces that are electrically heated or heated with gas heating, and having decalcification means for removing lime particles from the boiler including water drain means arranged close to the floor and to the side wall of the boiler for, as needed, at least partial emptying of the boiler for the purpose of flushing out lime particles that have flaked off and collect at the floor of the boiler. The improvements are the water drain means comprises first means for generating a flow in the steam generator that automatically kicks in at preferably adjustable intervals dependent on the operating duration and/or operating temperature of the heating means, said first means supplying the water to an elimination device.

The new steam generator has the first means for generating a flow that permeates the steam generator is formed therein and supplies the water to an elimination device.

In a preferred embodiment, the first means for generating a flow comprises the elimination device and is fashioned as a siphon or suction tube having a drain provided at the floor of the boiler. It is thus possible to close the water column in the siphon by intentionally over-filling the steam generator, as a consequence the siphon is actuated to completely empty the steam generator.

It is also preferred that the first means for generating a flow is a scouring or flushing pump, whereby a scouring or flushing admission that is connectable and disconnectable in common with the pump is arranged close to the floor of the boiler at a location close to the boiler wall lying essentially diametrically opposite the pump. It can thereby be provided that the scouring pump and/or the scouring admission penetrate the boiler wall close to the floor of the boiler. Further, it may also be provided that the heating means is arranged above the level of the scouring pump and of the scouring admission while leaving a flushing path that is essentially free of flow impediments. It can also be provided that flow guiding devices, for example flow baffles or the like, are arranged in the flow path between the scouring pump and the scouring admission. In its idle position, the scouring pump can form a flow connection between the boiler and the water admission of the cooking equipment. It is also proposed that the water admission has an over-pressure discharge that is in communication with the atmosphere above the water level in the boiler.

It is especially preferred when the floor of the boiler proceeds at a slope from the scouring admission to the scouring pump.

This embodiment is based on the surprising perception that the claimed combination of a scouring or flushing pump and of a scouring or flushing admission that is situated at a position of the boiler lime diametrically opposite the position of the scouring pump succeeds in reliably flushing the lime particles collecting a the floor of the boiler as a consequence of the strong flow and as a consequence of the forced conveying with the scouring pump. The pump itself, fashioned, for example, as a rotatory pump, preferably serves as a part of the water admission while maintaining a free flow connection between the water and the boiler and the water admission in the "normal condition" in which it is thus not working and as a result whereof the interior of the pump is kept completely free of lime particles. Whenever the pump kicks in, thus, lime particles are not situated inside the pump, these otherwise possibly impeding a faultless start. The discharge of the scouring pump is preferably connected with the condensate drain of the cooking equipment that is already present, so that no additional drain is required. In order to assure that the decalcification means is only actuated when there is no normal operation of the cooking equipment, it is advantageous when a suitable control adjustment sees to it that the scouring pump and the scouring admission can only be actuated when the water temperature inside the boiler amounts, for example, to less than 50° C. and the cooking equipment was shut off for a period of time, for example, for at least eight hours. An embodiment of the invention is particularly advantageous wherein the connection of the scouring pump to the water admission simultaneously acts as over-pressure valve for the cooking space, as a result whereof an additional over-pressure valve in the cooking space can be foregone.

A further preferred embodiment of the invention is characterized in that a flow-generating or first means is provided that causes the boiler water to flow, preferably in pulsating and/or periodically changing fashion, during the operation of, in particular, the steam generator and that the flow entrains lime particles that have already been deposited as well as lime particles that are still situated in the boiler water and conveys them to the elimination means fashioned as a sediment container.

It can thereby be provided that the flow-generating means comprises a steam pump connected to the steam generator. This steam pump comprises a cooling means, and that the sediment container is arranged in the lower region of the steam pump.

The invention may also provide that the flow-generating means comprises a mechanically operated pump.

The steam pump set forth above can be integrated in the steam generator or can be fashioned as a separate unit whereby the steam pump communicates with the steam generator via a water connection and via a steam connection. The coolant means comprises a coolant admission that can be identical with the water admission for the steam generator. When the coolant is delivered to the steam pump in a controlled fashion, the agent situated therein, namely steam and water, cools and, as a consequence of the cooling, an under-pressure is generated in the steam pump. This under-pressure in turn effects a strong flow of the water situated in the steam generator into the steam pump. Particles entrained by the flow will sink into the sediment container due to their dead weight. In addition, the coolant cools the water situated in the steam pump, so that this cooled water is over-saturated with lime and an intense formation of lime particles in the steam pump occurs. These particles likewise settle into the sediment container and can be removed from the container.

In the steam generator of the present invention, the lime layer formed on the surfaces of the steam generator are eroded or flaked off due to the erosive effect of the water flowing in pulsating fashion as a result of the flow of the water in the steam generator. The cleaning effect thus goes beyond a mere cleaning of the water and also covers deposits in the heating means and on the inside walls of the boiler.

Further features and advantages of the invention will be apparent from the following description wherein the invention is set forth by way of example with reference to embodiments shown in the drawings.

DESCRIPTION OF THE PREFERRED EMBODIMENTS

Figure 1:
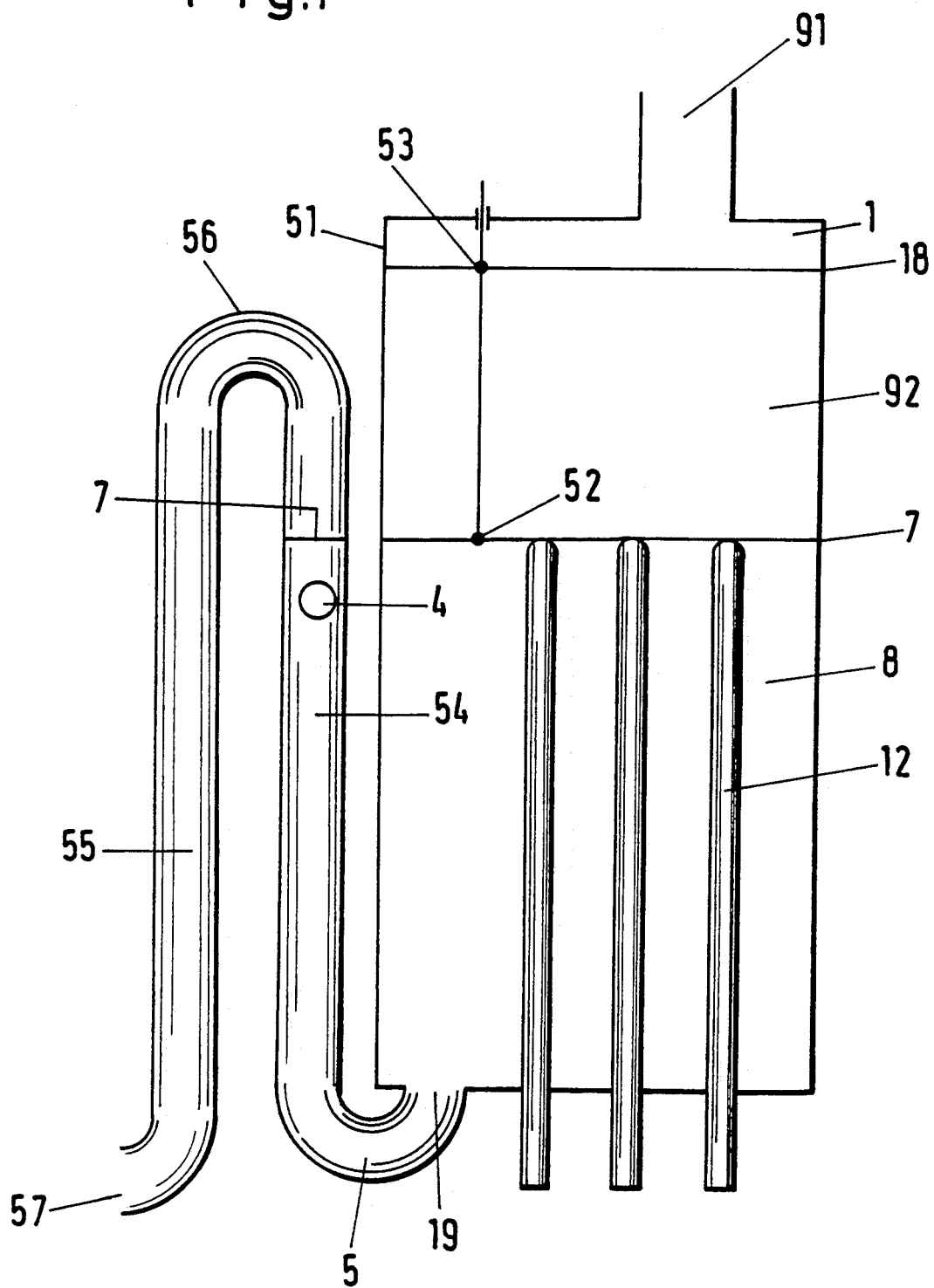
FIG. 1 is a vertical cross sectional view of a first exemplary embodiment of a steam generator of the present invention.

FIG. 1 shows a steam generator 1 that is essentially composed of a boiler 8 in which heating tubes 12 are arranged. The boiler 8 is filled with water up to the normal water level 7, and this water is heated by the heating tubes 12. A floor opening 19, that serves both as water admission as well as water discharge in this embodiment of the invention, is provided at the floor of the boiler 8. A suction tube or siphon 5, that is likewise filled with water up to the normal water level 7 during normal operation, is connected to the floor opening 19. A fresh water admission 4, that is situated below the normal water level 7, is provided in the suction tube 5. The normal water level 7 is monitored by a normal water level sensor 52. The steam generated in the steam generator 1 collects in the steam space 92 and can be discharged through the steam exit connectors 91. The suction tube 5 is essentially composed of two legs 54, 55 proceeding parallel to one another that are connected to one another at their upper end in a communicating fashion by a U-shaped connection. A suction tube discharge 57 that is situated below the level of the floor opening 19 is provided on the leg 55. For cleaning or, respectively, emptying the steam generator 1, the boiler 8 is filled with water above the normal water level 7 up to an over-filled water level 18. This over-filled water level 18 lies above the upper apex 56 of the suction tube 5 and will cause a priming of the siphon 5, which will then complete an emptying of the steam generator. The over-filled water level 18 is monitored by an over-filled water level sensor 53. The sensors 52 and 53 have a common grounded electrode 51 that lies at the housing of the boiler 8. In this embodiment of the steam generator the heating tubes 12 are arranged projecting vertically upward into the boiler 8. They are conducted toward the outside through the floor of the boiler 8 next to the floor opening 19. The flow generated by the draining via a suction tube 5 thus proceeds essentially parallel to the side walls of the boiler 8 and parallel to the heating tubes 12. At the same time, however, it is also conceivable to horizontally arranged the heating tubes 12 in the boiler 8, whereby they may also potentially project beyond the floor opening 19. An additional eddy flow around the heating tubes 12 is thereby produced, this will promote the flaking of lime from the heating tubes.

Figure 2:
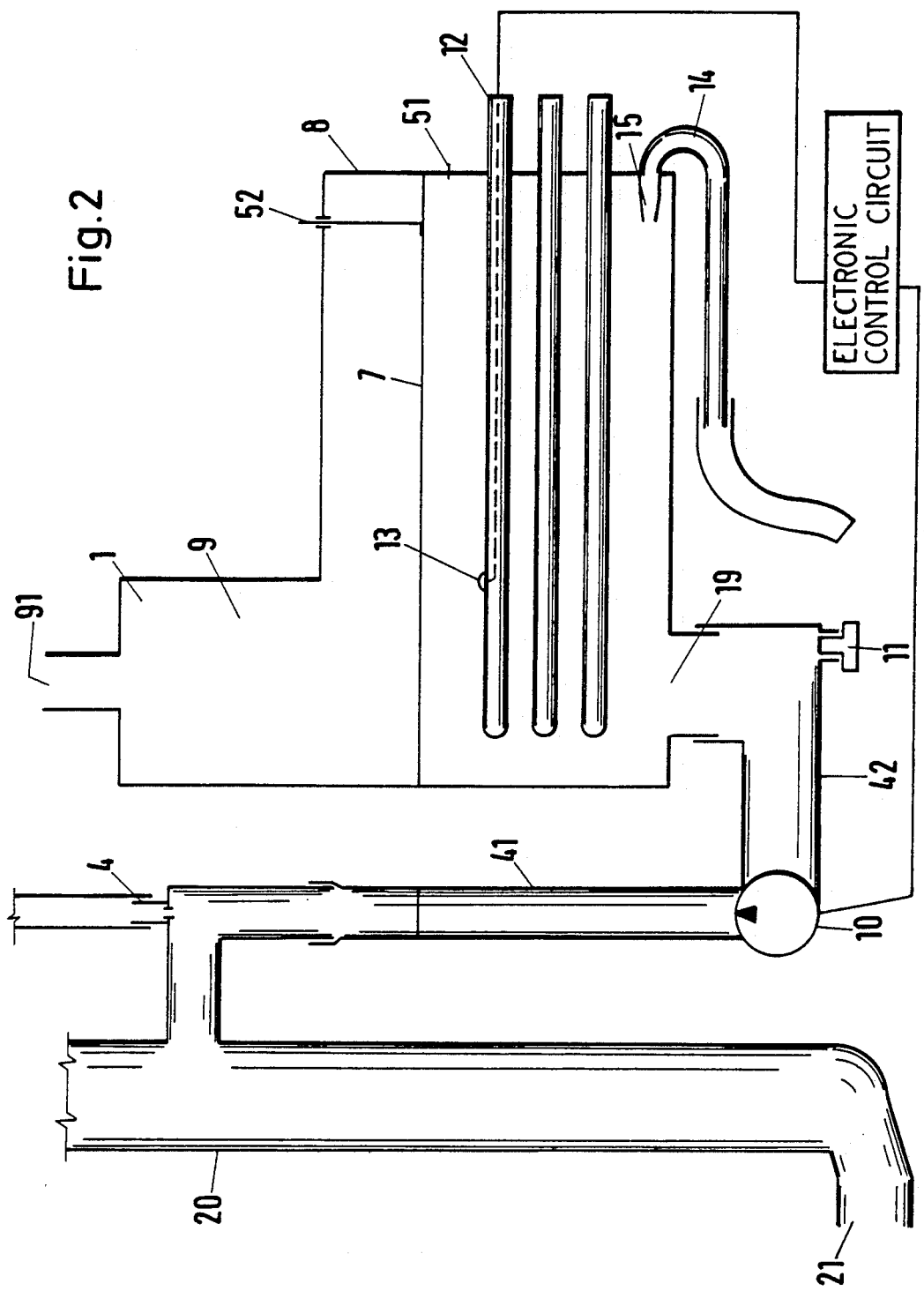
FIG. 2 is a schematic cross sectional view of a second exemplary embodiment of the steam generator.

FIG. 2 shows an embodiment of the steam generator 1 wherein the boiler 8 is provided with a dome-like upper part 9 from which steam can be discharged via a steam exit connector 91. The water situated in the boiler 8 is heated with horizontally disposed heating tubes 12. The temperature of the heating tubes 12 is acquired via a temperature sensor 13. The normal water level 7 is set by a normal water level sensor 52 via the fresh water admission 4 on the basis of an admission solenoid that is not shown here. The fresh water proceeds through the floor opening 19 into the boiler 8 of the steam generator 1 via a pump pressure hose 41, a flushing or scouring pump 10 as well as the pump connection 42. An electronic control circuit (not shown here) monitors the on-time of the steam generator 1 or the activation of the equipment and carries out an interrogation of the temperature sensor 13. When the temperature value shows that the heating tubes 12 are not being operated, the scouring pump 10 is actuated and the water admission is simultaneously released via a flushing or scouring admission 14 that is arranged at the wall of the boiler 8 close to the floor diametrically opposite the scouring pump 10. The scouring admission 14 can comprise a rinsing nozzle or jet 15 to increase the out-flow rate of the water being effected. For example, the control of the scouring admission 14 can ensue via a rinsing solenoid. The lime deposits on the floor of the boiler 8, which deposits are from the water and from flakings from the heating elements, have their major parts force-conveyed by the jet from the rinsing nozzle 15 through the floor opening 19 and into the pump connection 42. The scouring pump 10 conveys the water that contains lime particles to a drain 21 which is outside the device via the pump pressure hose 41 and via the device discharge 20. An emergency drain opening 11, that allows the water to be drained if the scouring pump 10 should fail, is provided at the lowest point of the pump connection 42. In this embodiment, the outlay for maintaining the steam generator is minimized, as are the required activities of the user since the cleaning process is carried out in a fully automated fashion.

Figure 3:
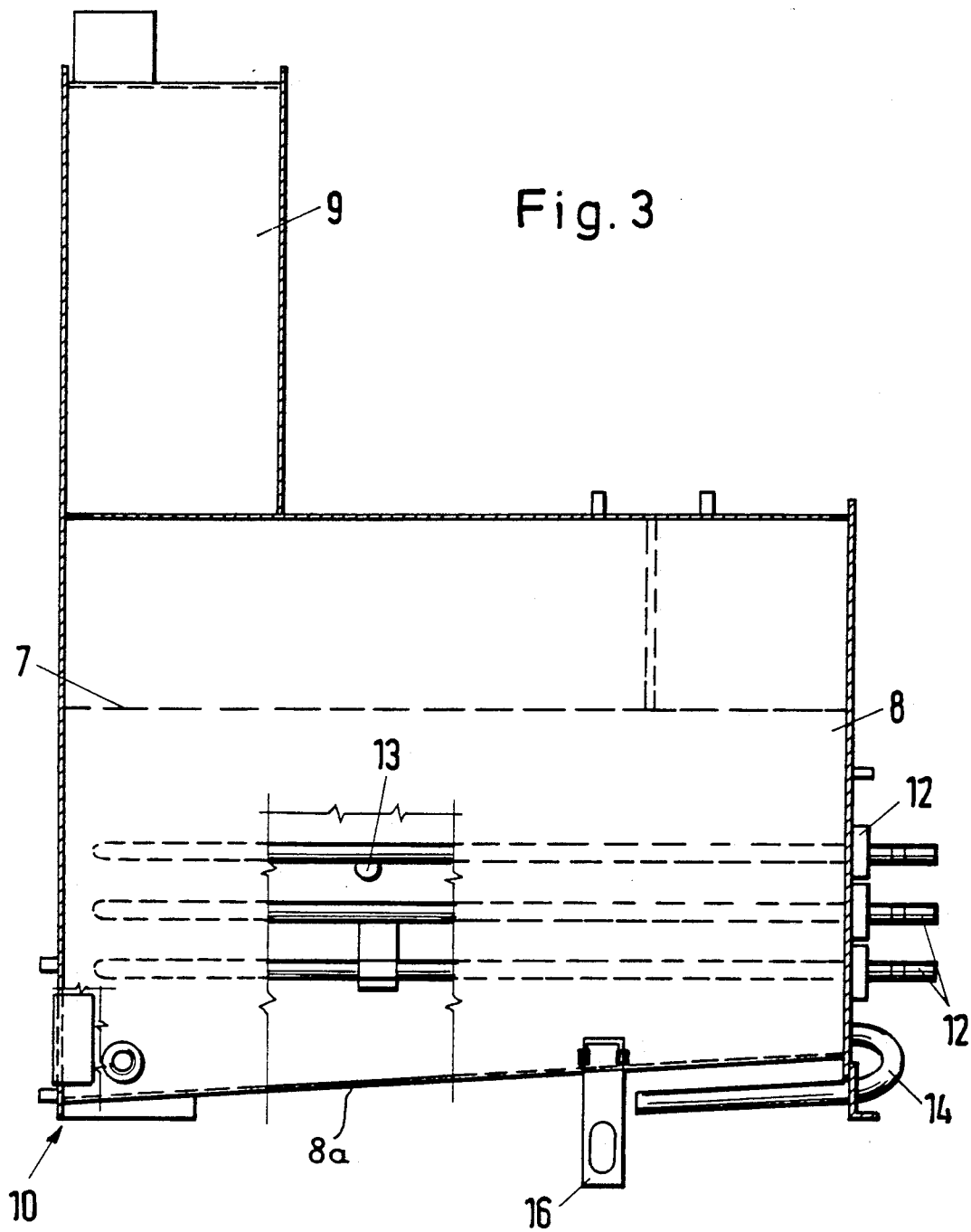
FIG. 3 is a side view with portions broken away of a third exemplary embodiment of the steam generator

The steam generator 1 of FIG. 3 again comprises a boiler 8 from whose dome-like upper part 9 hot steam is introduced as needed into the cooking chamber of a cooking device [now shown] via the steam exit connector 91. A scouring or flushing pump 10 in the form of an electrically actuatable rotatory pump is arranged close to the floor 8a of the boiler 8. This rotatory pump, in the idle condition, produces an open flow connection between the water situated in the boiler and a water admission (not shown) that in turn communicates with the atmosphere above the level of the water situated in the boiler 8. Electrically heatable heating tubes 12 are arranged inside the boiler 8. A scouring or flushing admission 14, that is actuatable in common with the scouring pump 10 in a fashion set forth below, is situated at that side of the boiler 8 diametrically opposite the scouring pump 10. A mount 16 serves the purpose of attaching the steam generator 1 to the cooking equipment and does not form part of the invention. What is important, however, is that the floor 8a of the boiler 8 slopes from the scouring admission 14 to the scouring pump 10 in an especially advantageous way, and guarantees that flaking lime particles, etc. collect on the floor of the boiler 8 preferably in the flow path between the scouring admission 14 and the scouring pump 10 and close to the pump.

The steam generator operates in the following way: the water level 7 inside the boiler 8 is held constant with an appropriate level control in a known way, i.e., measures are undertaken to see that so much water is resupplied into the boiler 8 over and over again via the flow connection through the scouring pump 10 that is open in the non-decalcifying mode so that a constant water level is observed dependent on steam consumption of the steam equipment. In the non-operating condition of the steam generator, i.e., when no steam is required for cooking in the cooking equipment, the scouring pump 10 kicks in at adjustable intervals upon simultaneous opening of the water admission by the scouring admission 14. As a consequence of this, lime particles that have collected on the floor 81 as a consequence of thermic cycling, etc., due to flaking and the like are reliably flushed out upon formation of an intense water flow along the floor of the boiler 8. The length of the intervals between the individual decalcification processes as well as, potentially, the length of the individual flushing events can be prescribed, namely dependent on the operating time and temperature of the steam generator that have occurred.

Figure 4:
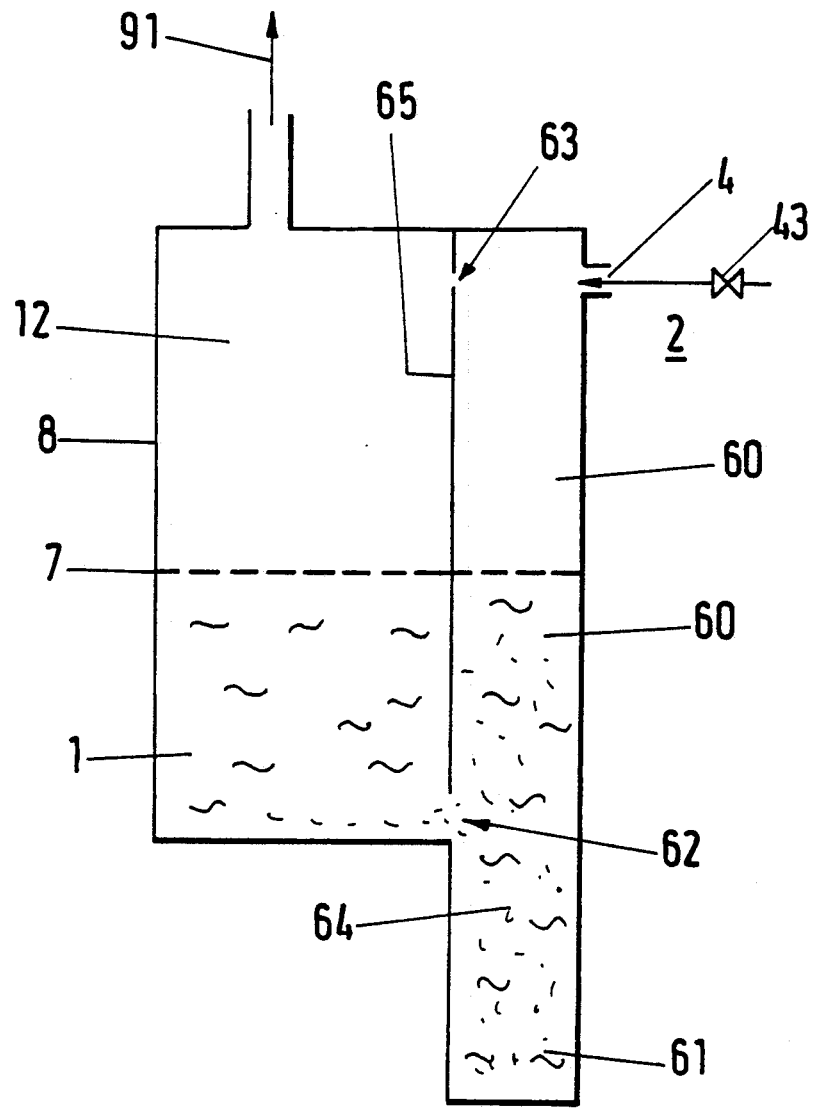
FIG. 4 is a schematic view of a fourth exemplary embodiment of the steam generator with water flowing in pulsating fashion and with an integrated steam pump.

FIG. 4 shows a steam generator 1 having an integrated steam pump 60. The steam generator 1 is filled with water up to the normal water level 7. The water is heated by heating tubes (not shown) or the like and is evaporated into the steam space 92 from where it can be discharged via a steam exit connector 91. The steam pump 60 is composed of a part of the cylindrical boiler 8, whereby one wall of the steam pump 60 is formed of at least one part of a wall of the boiler 8 of the steam generator 1 and represents a partition 65 between the steam generator 1 and steam pump 60. The partition 65 comprises a steam connection 63 in the form of an opening in the upper region of the steam pump 60 or, respectively, of the steam space 92 and also comprises a water connection 62 close to the floor of the boiler 8, likewise in the form of an opening. The steam generator 1 and the steam pump 60 are in communication with one another via these openings 62, 63. A sediment container 61 whose opening area extends over the entire bottom area of the steam pump 60 is provided under the steam pump 60. The sediment container 61 is completely filled with water because of the connecting opening 62 to the steam generator 1, whereas the steam pump 60 is filled with water up to the normal water level 7, i.e., up to the same height as the steam generator 1. A cooling means 2 is provided in the upper region of the steam pump 60. This cooling means 2 can be a surface cooler having a cooling circulation separated from the steam pump 60 or, as shown here, can be a direct water cooler with the delivery of cold water via the fresh water admission 4 directly into the upper space of the steam pump 60. The delivery of fresh water or cold water is controlled by a valve 43. When cold water is then introduced into the steam pump 60, the steam condenses in the upper region of the steam pump 60 and generates an under-pressure or vacuum which causes the water and the steam to be suctioned from the steam generator 1 into the steam pump 60. Due to the flow that occurs in this fashion, the particles situated in the water of the steam generator are also entrained and intercepted and collected in the sediment container 61. The fresh water introduced into the steam pump 60 continues to mix with the water in the steam pump 60 and cool it, so that an over-saturated lime solution occurs in the steam pump 60 and, thus, an intense formation of lime particles will occur in the steam pump 60. Due to the pressure equalization in the upper region of the steam pump 60, the water flows out of the pump via the opening of the sediment container into the boiler, whereby the lime particles situated in the water are deposited in the sediment container 61, so that a major part of the lime contained in the introduced water does not proceed back into the steam generator 1 at all. The water flowing out of the steam generator 1 into the steam pump 60 has an erosive action on the side walls and on the bottom surface of the boiler 8, as a result lime residues and agglomerations will be eroded. Since the sediment container 61 covers the entire bottom area of the steam pump 60, it is assured that the major part of the lime particles proceeding into the steam pump 60 ar precipitated out into the sediment container 61.

Figure 5:
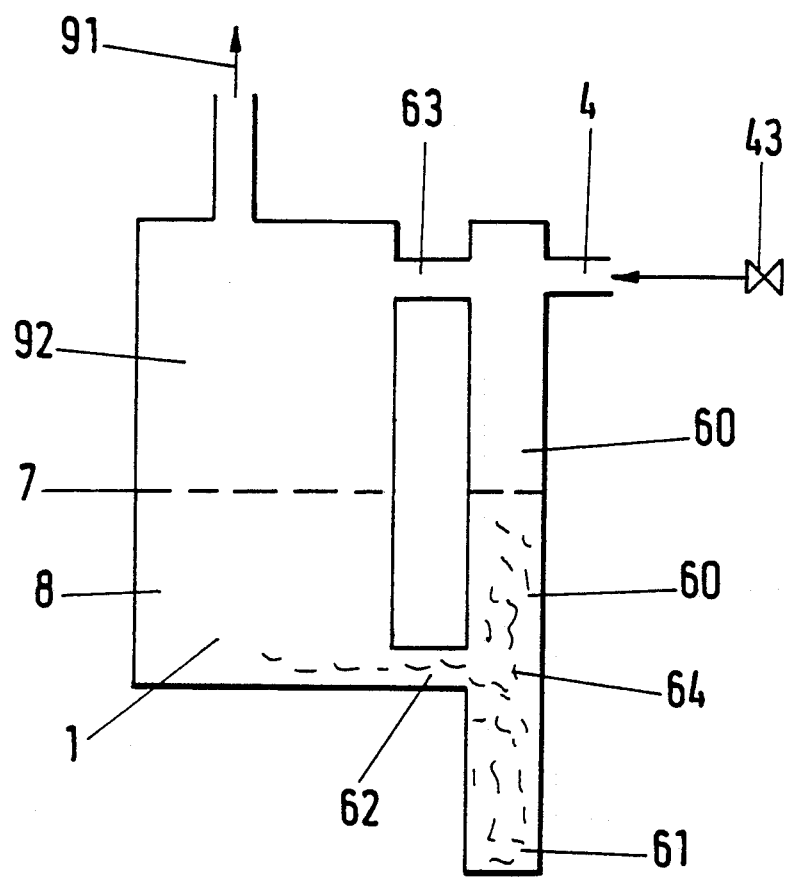
FIG. 5 is a schematic view of a fifth exemplary embodiment of the steam generator having water flowing in pulsating fashion and having a separate steam pump.

FIG. 5 shows a steam generator 1 having a separately fashioned steam pump 60, wherein the steam pump 60 communicates with the generator 1 by a water connection 62 and a steam connection 63 that are both fashioned as pipes or the like. The space between the steam generator 1 and the steam pump 60 can be filled out with insulating material. The separate arrangement of the steam generator 1 and steam pump 60 assures that a good thermic separation is present between the two units, and this will promote the effect to be achieved by the cooling. The steam pump 60 is again an essentially cylindrical member that is filled with water up to the normal water level 7, just like the steam generator 1. A fresh water admission 4 for cold water is again provided in the upper region of the steam pump 60, whereby the water admission is controlled via a valve 43. The function sequence and action correspond to the embodiment of FIG. 4.

Although various minor modifications may be suggested by those versed in the art, it should be understood that we wish to embody within the scope of the patent granted hereon all such modifications as reasonably and properly come within the scope of our contribution to the art.

We claim:

1. In a steam generator for cooking equipment, particularly for table-top or footed equipment for gastronomy, industrial kitchens or the like working in combination with hot air and hot steam, said generator comprising a water-filled boiler having an automatic, level-regulated water admission, a steam discharge for automatic introduction of hot steam into the cooking chamber of the cooking equipment as needed, said generator having heating means operating at intervals, and having decalcification means for removing lime particles from the boiler including water drain means arranged close to the floor and to the side wall of the boiler for, as needed, at least partial emptying of the boiler for the purpose of flushing out lime particles that have flaked off and collect at the floor of the boiler, the improvements comprising the water drain means having first means for generating a flow in the steam generator that automatically kicks in at preferably adjustable intervals dependent on the operating duration and/or operating temperature of the heating means, said first means supplying the water to an elimination device.

2. In a steam generator according to claim 1, wherein the first means encompasses the elimination device and is fashioned as a siphon having a drain provided at the floor of the boiler.

3. In a steam generator according to claim 1, wherein the first means comprises a flushing pump whereby a flushing admission that can be connected and disconnected in common with the pump is arranged close to the floor of the boiler at a location close to the boiler wall that preferably lies diametrically opposite to the pump.

4. In a steam generator according to claim 3, wherein the pump and/or the flushing admission penetrate the boiler wall close to the floor of the boiler.

5. In a steam generator according to claim 4, wherein the heating means is arranged above the level of the pump and of the flushing admission while leaving a flushing path that is essentially free of flow impediments.

6. In a steam generator according to claim 3, which includes flow guiding means being arranged in the flow path between the pump and the flushing admission.

7. In a steam generator according to claim 3, wherein the pump forms an open flow connection between the boiler and the water admission of the cooking equipment in its idle position.

8. In a steam generator according to claim 7, wherein the water admission comprises an over-pressure discharge that is in communication with the atmosphere above the water level in the boiler.

9. In a steam generator according to claim 3, wherein the floor of the boiler proceeds at a slope from the flushing admission to the pump.

10. In a steam generator according to claim 1, wherein the first means during operation of the steam generator causes the boiler water to flow in preferably pulsating and/or periodically changing fashion and thereby entrains lime particles that have already settled as well as lime particles that are still situated in the boiler water and conveys the particles to the elimination device which is fashioned as a sediment container.

11. In a steam generator according to claim 10, wherein the first means comprises a steam pump connected to the steam generator, said steam pump comprising a cooling means and said sediment container is arranged in the lower region of the steam pump.

12. In a steam generator according to claim 10, wherein the first means comprises a mechanically operated pump.

* * * * *